June 16, 1936.  R. BECK  2,044,461

MEANS FOR CONTROLLING HEAT EXCHANGE APPARATUS

Filed July 20, 1934

INVENTOR
Rudolf Beck.
BY Darby & Darby
ATTORNEYS.

Patented June 16, 1936

2,044,461

UNITED STATES PATENT OFFICE 2,044,461

MEANS FOR CONTROLLING HEAT EXCHANGE APPARATUS

Rudolf Beck, Bridgeport, Conn., assignor to Consolidated Ashcroft Hancock Company, Inc., Bridgeport, Conn., a corporation of Delaware Application July 20, 1934, Serial No. 736,185

7 Claims. (Cl. 236—82)

This invention relates to improvements in apparatus for controlling the temperature and pressure conditions in heat exchange apparatus.

An important object of this invention is to provide a control system for a valve which controls the supply of a heating or cooling medium to a heat exchange apparatus so that the inherent friction of that valve is compensated for.

A further object of this invention is to provide in such a system means whereby the sensitivity of the valve may be readily adjusted to meet various operating conditions.

A further object of the invention is to provide an apparatus which may be readily adjusted by simple manipulations to change the time characteristics of the control system.

These and many other objects, which will be more clearly set forth in connection with the details of construction and operation, are successfully secured by means of this invention.

This invention resides substantially in the combination, construction, arrangement, and relative location of parts, all as will be set forth in greater detail in the following specification.

In the drawing—

Figure 1:
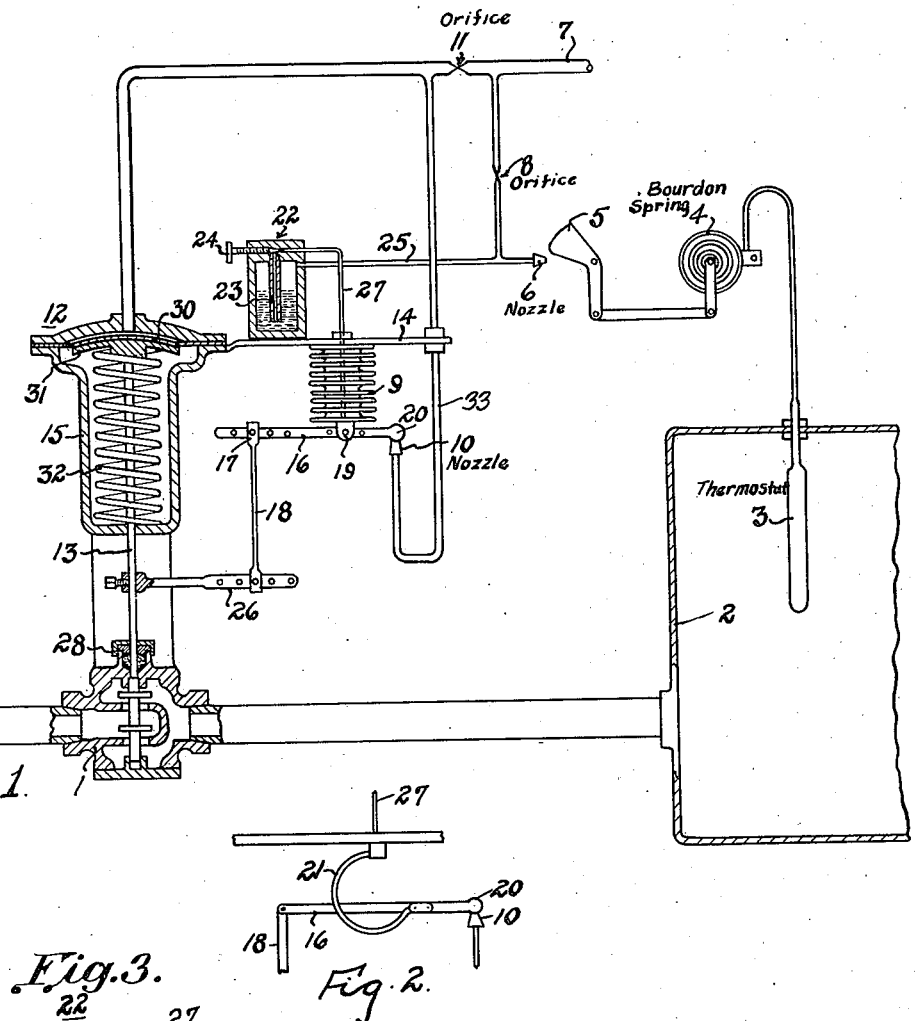
Figure 1 is a diagrammatic view of the apparatus of this invention showing some parts in cross section.

It is common practice in the control of heat exchange apparatus, whether it be for the purpose of heating or cooling, to employ fluid pressure for operating the valve or damper which controls the flow of the heating or cooling medium so that the temperature of the heat exchange apparatus may be accurately maintained between the desired limits. It is likewise common practice in such systems to provide automatic apparatus, subject to the temperature conditions of the heat exchange apparatus, for controlling the flow of the fluid pressure medium. Many forms of apparatus have been devised of this general nature and the general object of this invention is to provide certain improvements in the structure and arrangement of the parts of such apparatus whereby the temperature in the heat exchange apparatus may be very accurately controlled between definite limits and by means of which the inherent frictional forces and time characteristics of such apparatus may be compensated for to insure rapid variation and accurate maintenance of temperature or pressure conditions between the desired limits within the heat exchange apparatus.

The true nature and scope of the invention will be set forth in connection with the following detail description.

The heat exchange apparatus, whether it be a heating or a refrigerating machine, is illustrated diagrammatically at 2. The heating or cooling medium is supplied through a pipe which includes the main control valve 1, which of course controls the flow of heating or cooling medium therethrough to the heat exchange apparatus 2. Within the apparatus 2 is the temperature and/or pressure sensitive bulb 3, exposed to the temperature and/or pressure conditions within the heat exchange apparatus and sensitive thereto. This bulb 3 is connected by a tube to the pressure or temperature sensitive element 4 which has been illustrated as a Bourdon spring. This Bourdon spring is connected by a linkage system to a pivotally mounted member 5 in the form of a segment positioned to be moved by the spring 4 into and out of registry with a small air nozzle 6. This part of the apparatus is well known in many forms and need not be described in further detail. Compressed air, or its equivalent, is supplied from any suitable pressure source through the pipe 7 to the various parts of the equipment. Pipe 7 is connected by a branch to the nozzle 6, which branch includes an orifice or restriction 8, likewise in accordance with well known practice. The action of this part of the system is to supply variable air pressure for actuating the remaining parts of the control equipment.

Figure 3:
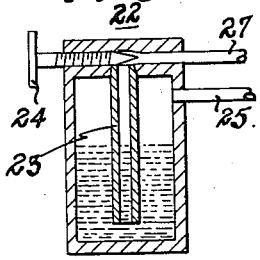
Fig. 3 is an enlarged vertical central cross-sectional detail view.

The variable air pressure thus created is supplied through pipe 25 to a small tank or container 22 which contains a body of oil into which the tube 23 dips so that the variable air pressure through pipe 25 acts upon the surface of the oil body. The upper end of tube 23 communicates with pipe 27 through an adjustable needle valve 24, as is clear from Fig. 3. The pipe 27 connects with an expansible bellows structure 9 which is supported from a fixed arm 14 on the motor casing 15 of the fluid pressure motor 12 which controls the main valve 1. The function of the oil container 22 will be described later at a time when its utility will be more apparent. It will be assumed for the moment, in describing the apparatus, that pipes 25 and 27 are directly connected.

Within the motor casing 15 is a flexible diaphragm 30 which presses upon a head 31 which is normally urged upwardly by a spring 32. Connected to the head 31 is the valve rod 13 of the valve 1. This valve rod passes through the usual packing gland 28, which is the source of friction which is compensated for, as will be apparent from the description of the operation. Secured to the valve stem 13 for movement therewith is a rigid arm 26 which is pivotally connected by a link 18 at the point 17 to a lever 16, which in turn is pivotally connected at 19 to the lower end of the bellows 9. The end 20 of lever 16 is positioned directly opposite another nozzle 10 which in turn is connected by a pipe 33 to the fluid pressure supply pipe 7 on the opposite side of the restriction or orifice 11 to the point of connection of the branch containing the orifice 8.

It will be noted that the nozzle 10 is a fixed nozzle and that the end 20 of the lever 16 is movable relative thereto. It will also be noted that the link 18 may interconnect the levers 16 and the arm 26 at different distances from the pivot point 19, as exemplified by the plurality of holes in the lever and arm. It will also be noted that the bellows 9 is rigidly supported at one end from the arm 14 and is free at its lower end.

The operation of the apparatus will now be given upon the assumption of definite temperatures, pressures, and movements of the parts, since it is believed that the action will be clearer. Assume that the temperature in the heat exchange apparatus 2 is to be maintained between the temperatures of 180 and 182° F. Further assume that at 180° F. the pressure in the bellows 9 is two pounds per square inch, at 181° F. seven pounds per square inch, and at 182° F. twelve pounds per square inch. Also assume that it is desirable to have the valve 1 one-half inch open at 181° F., and at 180° F., one-quarter inch open at 181° F., and completely closed at 182° F. The bellows 9 is selected so that it will produce a movement at its lower end of one-eighth of an inch in accordance with a pressure change therein between two and seven pounds per square inch, and a movement of one-eighth of an inch between seven and twelve pounds per square inch change in pressure. The link 18 is so adjusted that with the valve 1 one-half inch open and a pressure of two pounds per square inch in the bellows the end 20 of lever 16 will be positioned about 0.002 inch from the discharge end of nozzle 10.

A slight increase in pressure in the bellows 9 will cause the end 20 of lever 16 to close the nozzle 10 since the downward movement of the free end of the bellows will cause the lever 16 to pivot about the point 17. The closing of the nozzle 10 will cause the building up of pressure in pipe 33, pipe 7, and the chamber above the diaphragm 30. This will cause the valve stem 13 to move downwardly against the action of spring 32 and move valve 1 towards closed position. For instance, if bellows 9, under this change in pressure, expands so that its lower end moves one-sixteenth of an inch and the lever ratio 20:19 to 20:17 is 1:2, the valve stem will move two times one-sixteenth of an inch, or one-eighth inch, in a direction to close the valve before the end 20 of lever 16 begins to open the nozzle 10. This prevents further movement of valve 1. It is obvious, therefore, that the valve will travel proportionately to the bellows, the ratio being determined by the lever ratio 20:19 to 20:17.

To adapt the device to valves of different sizes with different valve lifts, it is only necessary to change this lever ratio.

Aside from changing the lever proportions for various valve sizes, provision is also made for changing the leverage at the joint 17, which pivot point may be shifted to the various journal holes on lever 16, thereby permitting a change in the temperature sensitivity of the control apparatus. In the above example it was assumed that a pressure change of two to twelve pounds per square inch was required to cause the valve 13 to travel from fully open to closed position and that bellows 9 would expand a total of one-quarter of an inch when exposed to this change in pressure of ten pounds. Now, if the lever length 17:20 is made four times the length of the lever 19:20 the bellows 9 must travel only one-fourth of the one-half inch valve travel, or one-eighth of an inch instead of one-quarter of an inch as before. Suppose then the control spring 4, segment 5, nozzle 6, and orifice 8 produced the ten pound pressure change in the bellows 9 for a temperature change of 2° at the bulb 3. Then, with the above change in leverage, as stated, it will require a temperature change of only 1° at the bulb 3 to cause valve 1 to move from fully open to fully closed position, or in other words the temperature sensitivity of the apparatus has been doubled.

It is a known fact in this art that when the temperature sensitivity of such a control system is increased there is a likelihood of the development of hunting unless the time factor of the system is adapted to the time factor of the device under control. With the sensitivity set for a 2° variation a throttling control may be obtained, but on changes in demand at the heat exchange apparatus the temperature can adjust itself to any point within the control band of 2°. When adjusted to a control band of 1° the valve will react so quickly to temperature changes as to move continuously from open to closed position and back again unless the time factor of the valve, which normally would be somewhere between five and thirty seconds, is considerably increased.

It is here that the oil tank arrangement 22 comes in to control the time factor of valve 1. Pipe 25, instead of being connected directly to pipe 27, is connected through the oil device 22 which is partially filled with oil. As stated, pipe 23 extends below the surface of the oil and terminates near the bottom of the tank. The fluid pressure from pipe 25 acts upon the surface of the oil body. As the pressure increases the oil is forced up into the tube 23. It will be noted that the pipe 27 extends towards and terminates near the bottom of the bellows when in its contracted position.

On starting up the bellows is filled with air at atmospheric pressure. As the pressure builds up in pipe 25 and on the surface of the oil, the oil is forced upwardly through tube 23 and through the needle valve 24 into the bellows. To build the pressure from zero pounds gauge, or fifteen pounds absolute, to twelve pounds gauge, or twenty-seven pounds absolute, the air in the bellows has to be compressed in the ratio of 27:15. A volume of oil corresponding to 12/27ths of the volume of the bellows, plus their volume increase upon expansion therefore has to be forced through the needle valve to build up the twelve pounds gauge pressure in the bellows. This arrangement permits of an increase in the time for closing the valve of fifteen to twenty times, as against the use of a needle valve or orifice inserted directly between line 25 and bellows 9 because the time required for a definite volume of liquid to pass through an orifice is very much longer than the time for an equal volume of a gas. By adjusting the position of the needle valve 24 the time factor of the main valve 1 can be adjusted to adapt the valve to varying conditions as encountered in different types of heat exchangers to which the apparatus may be applied.

This system has certain additional advantages over those which are apparent from the above description. Instead of having a constantly changing supply of air coming through needle valve 24, which would gradually deposit dirt and sediment from the compressed air supply in the small orifice to the valve, there is always the same oil passing to and fro through this valve. Any dirt which may be carried in by the air through pipe 25 is either deposited on the surface of the oil or settles through the oil to the bottom of the container 22 and does not reach the needle valve.

Figure 2:
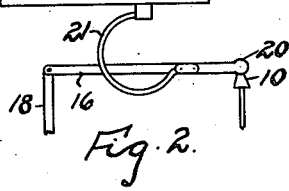
Fig. 2 is a detail view of a modified portion of the complete system.

As will be apparent, this invention is of course not restricted to the use of a bellows as the pressure responsive element since various other known forms of pressure responsive elements may be used. For example, Fig. 2 illustrates a different arrangement in which the Bourdon pressure tube 21 is substituted for the bellows in a manner which will be apparent to those skilled in the art.

It is also apparent that when desired a pressure relay may be inserted between the nozzle 10 and the diaphragm motor 12, especially for large valve sizes where the simple nozzle and orifice arrangement as shown would either be too slow or, if the nozzle and orifice were made large enough to give the proper speed of operation, too much air would be wasted. Likewise a relay can be inserted between the nozzle 6 and the bellows 9 to increase the sensitivity of this part of the apparatus. Such additions are well known in the art and do not change the principle or scope of this invention.

Further emphasis of the advantages of this system seems desirable. The valve diaphragm motor assembly 1—12, as commercially manufactured, is subject to a certain amount of inherent friction, generated mostly at the packing gland 28. This friction is practically inevitable, especially where high pressure valves are employed and a tight packing is necessary. If the nozzle 6 were connected directly to the diaphragm motor 12, this valve might be closed to within one-quarter of an inch as the pressure on the diaphragm is rising to seven pounds per square inch.

Assuming that one pound pressure per square inch is required to overcome stuffing box friction, and supposing the temperature in the heat exchange apparatus is getting too low, requiring the valve to open wider, the friction force reversing in direction with a reversal of motion of the valve would require a reduction in the pressure on the diaphragm from seven to five pounds per square inch before any movement of the valve occurred. This means that the temperature in the heat exchange apparatus will drop a corresponding and undesirable amount before the valve even begins to move. By interposing the bellows 9 and nozzle 10 the fact that the pressure on diaphragm 30 must be reduced from seven to five pounds per square inch is not altered. However, to produce this change requires a movement of only 0.001 inch of the lever 16 away from the nozzle 10. This requires a change of pressure in 9 of less than 0.1 pound per square inch as against two pounds in the above case. The drop in temperature required to produce the proper response of valve 1 is thus correspondingly similar.

Other factors which in a way similar to the stuffing box friction affect the response of the valve position to the air pressure applied to the valve diaphragm are hysteresis of the diaphragm material, which usually is rubber, ageing (stiffening) of the diaphragm, and the generally varying pressure of the heating fluid against the unbalanced area of the valve disc. All these factors make the response of the valve irregular, where the thermostatic system controls the air pressure to the valve diaphragm directly.

With this invention the air pressure produced by the thermostatic system in definite ratio to temperature changes positions the bellows 9 in exact ratio to the temperature changes, and the bellows position in turn controls the valve position in definite ratio, practically irrespective of the various disturbing factors of the conventional valve design.

As this art is fully aware, inventions of this type are not necessarily limited to use with heat exchange apparatus nor are they limited to actuation by variation in temperature and/or pressure conditions. Such control systems, as the art fully knows, may be employed in the control of many forms of apparatus in which some condition varies from a set value at which it is desired to maintain that condition. It is also clear and well known in this art that these systems, when used in combination with heat exchange apparatus, work in the same manner whether the heat exchange apparatus be one into which heat is put or one from which heat is abstracted. For this reason it is intended in the claims that the expression "heat exchange apparatus" will cover, as is well known, both kinds of heat exchange apparatus.

From the above description it will be apparent that this invention resides in certain principles of construction and operation which may be put in other physical forms without departure from the scope of this invention. I do not, therefore, desire to be strictly limited to the disclosure as given in an illustrative sense but rather to the scope of the appended claims.

What I seek to secure by United States Letters Patent is:

1. In a system of the type described, the combination comprising a heat exchange apparatus having a supply conduit connected thereto and a pressure motor operated valve in said conduit, a pressure supply conduit connected to said motor having a bleed port, a pressure responsive device for controlling the discharge from said bleed port, a fluid pressure supply pipe to said device including means for maintaining a mobile body of liquid in said pipe, said pipe having a bleed port, means for adjustably restricting movement of said liquid, and means subject to the temperature in said heat exchange apparatus for controlling the discharge from said bleed port.

2. In a control system, the combination comprising a heat exchange apparatus, a supply conduit connected thereto having a valve therein, a fluid pressure operated motor for said valve, a fluid pressure supply conduit connected to said motor having a bleed port therein, a pressure responsive device for controlling the discharge through said port including a fluid pressure supply pipe for the device, means subject to the temperature in the heat exchange apparatus for controlling the fluid pressure in the supply pipe, a liquid container in series with said supply pipe, and an adjustable restriction means for varying the flow of liquid there past to change the rate of response of said device.

3. A system as described, comprising a heat exchange apparatus, a conduit connected to said apparatus having a valve therein, a fluid pressure operated motor for operating said valve, a fluid pressure supply conduit to said motor having a branch terminating in a bleed port, a fluid responsive device, a lever pivotally mounted on said device and positioned to control the bleed port, means for pivotally interconnecting the lever with said fluid pressure operated motor, a fluid pressure supply pipe connected to said device including a liquid container having an adjustable needle valve to restrict the flow of liquid there past, said pipe having a bleed port, and means subject to the temperature conditions within the heat exchange apparatus for controlling the discharge from said second bleed port.

4. In a system as described, the combination comprising a fluid supply pipe having a pressure fluid motor operated valve therein, a fluid pressure supply conduit for the pressure motor of the valve having a branch with a bleed port, means subject to the variation of a condition to be controlled for varying the discharge of fluid from said port, a pressure responsive element mounted on a fixed support, a connection from said branch to said pressure responsive device, a second branch connected to said conduit having a bleed port, a lever pivotally mounted on said pressure responsive device intermediate the ends of the lever, one end of said lever being opposite the second mentioned bleed port, and means interconnecting the other end of said lever with said pressure motor.

5. The combination comprising a valve having a fluid pressure operated motor for operating it, a pipe connected to said motor, means for controlling the flow of fluid through said pipe comprising a valve mechanism of the supply and waste type, a control couple therefor, the relative movement of the elements of the couple governing the operation of said valve mechanism, a pressure responsive device, one of the elements of said couple being pivotally mounted on said device, means for connecting said element to said motor, a second control couple, the relative movement between which governs the supply of pressure fluid to said device, and means responsive to the fluctuations of a variable condition for relatively positioning the elements of the second couple.

6. In an apparatus of the type described, the combination comprising a supply pipe, a valve in said pipe, a pressure fluid operated motor connected to said valve, a pressure fluid supply conduit for said motor having a bleed port, a pressure responsive device mounted on a fixed support, a lever pivotally mounted on said device intermediate the ends of the lever, one end of the lever being positioned opposite said port, means for interconnecting the lever with said motor, a branch connection from said conduit to said pressure responsive device having a bleed port, and means responsive to variations in a condition to be controlled for controlling the discharge of fluid from said second port.

7. In an apparatus of the type described, the combination comprising a supply pipe, a valve in said pipe, a pressure fluid operated motor connected to said valve, a pressure fluid supply conduit for said motor having a bleed port, a pressure responsive device mounted on a fixed support, a lever pivotally mounted on said device intermediate the ends of the lever, one end of the lever being positioned opposite said port, means for interconnecting the lever with said motor, a branch connection from said conduit to said pressure responsive device having a bleed port, means responsive to variations in a condition to be controlled for controlling the discharge of fluid from said second port, means forming in said branch connection a chamber containing a liquid, movements of said liquid operating the pressure responsive device, and means for restricting the movements of said liquid.

RUDOLF BECK.